March 7, 1939.　　　M. GREENBAUM　　　2,149,731
SHARPENER FOR CLOTH CUTTING MACHINES
Filed June 28, 1935　　　2 Sheets-Sheet 1
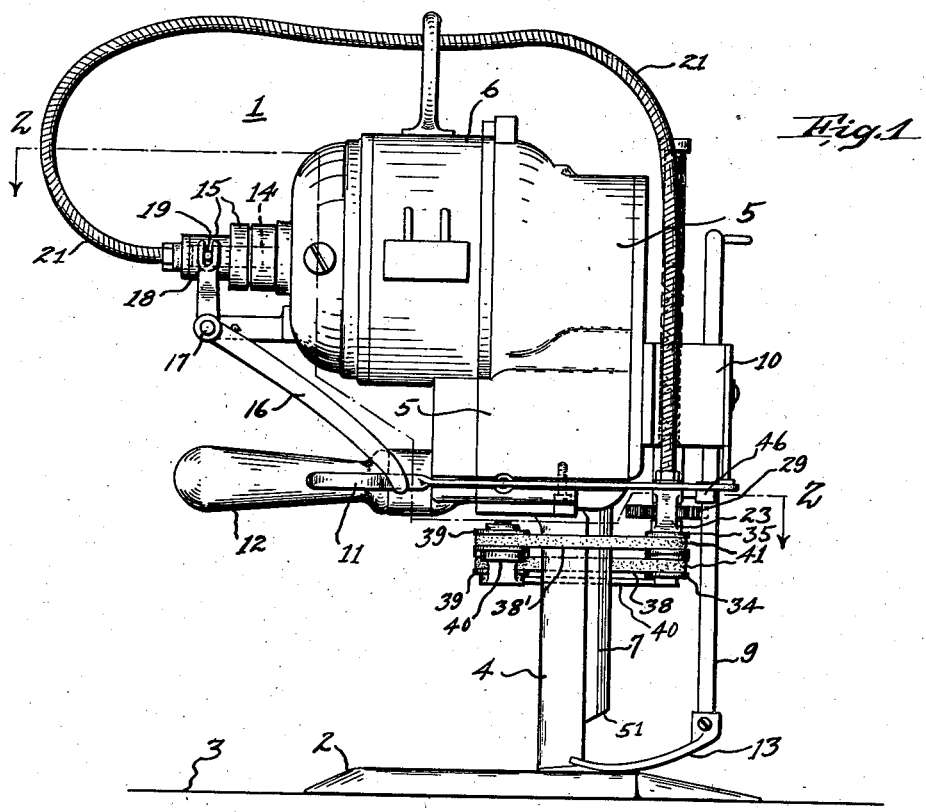
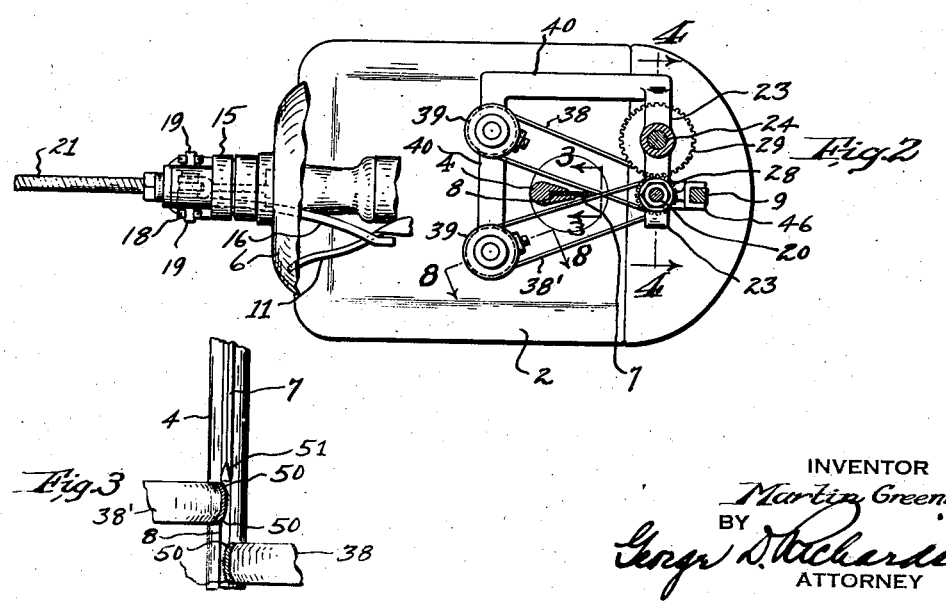
INVENTOR
Martin Greenbaum
BY
George D. Richards
ATTORNEY March 7, 1939.   M. GREENBAUM   2,149,731
SHARPENER FOR CLOTH CUTTING MACHINES
Filed June 28, 1935   2 Sheets-Sheet 2
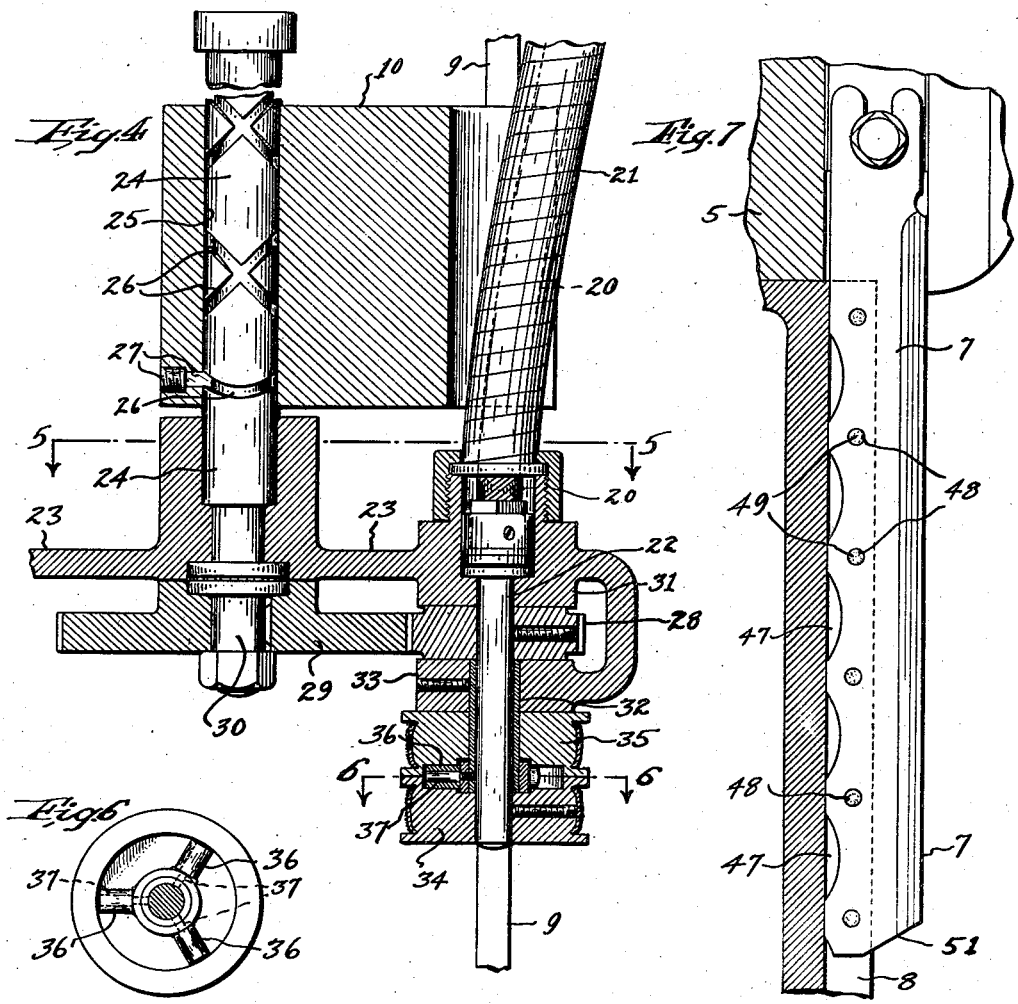
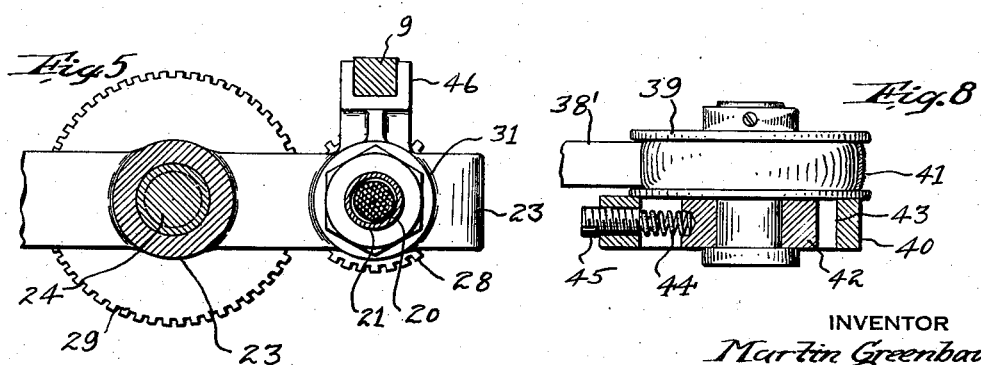
INVENTOR
Martin Greenbaum
BY
George D. Richards
ATTORNEY

Patented Mar. 7, 1939

2,149,731

UNITED STATES PATENT OFFICE 2,149,731

SHARPENER FOR CLOTH CUTTING MACHINES

Martin Greenbaum, Newark, N. J., assignor to Martin Industrial Development Co., Inc., Newark, N. J., a corporation of New Jersey Application June 28, 1935, Serial No. 28,799

12 Claims. (Cl. 51—246)

This invention relates, generally, to cloth cutting machines and the invention has reference more particularly to a novel improved cloth cutting machine of the straight knife or reciprocating blade type.

The straight knife type of cloth cutting machine is very popular with garment cutters owing to the ability of this machine to handle high lays of material at one time and to cut as sharp corners as may be desired. These machines as heretofore constructed, however, have not been entirely satisfactory in use, because of the difficulty in maintaining the reciprocating blade or knife in a sharp condition. These blades in order to properly cut some materials should be razor sharp and require resharpening every few minutes. Heretofore, these blades have been sharped by hand. This is very unsatisfactory, not only because of the time and effort involved, necessitating the removal of the machine temporarily from useful production, but also because it is difficult to obtain a sharp and straight edge by manual sharpening.

The principal object of the present invention is to provide a novel cloth cutting machine of the reciprocating blade type having power actuated means for sharpening the blade or knife whenever desired, said sharpening means serving to rapidly and accurately sharpen the knife and with the minimum of manual effort.

Another object of the present invention lies in the provision of a novel cloth cutting machine of the above character having power driven belts provided with abrasive material on their surfaces for engaging and sharpening the knife edge, the said belts being driven by suitable gearing from the motor of the machine.

Other objects of this invention, not at this time more particularly enumerated, will be clearly understood from the following detailed description of the same.

The invention is clearly illustrated in the accompanying drawings, in which:

Fig. 1 is a view in side elevation of the novel cloth cutting machine of this invention.

Fig. 2 is a sectional view taken substantially along the line 2—2 of Fig. 1 looking in the direction of the arrows.

Fig. 3 is an enlarged sectional view taken along line 3—3 of Fig. 2 looking in the direction of the arrows and showing the sharpening belts in their lowermost positions.

Fig. 4 is an enlarged fragmentary sectional view taken on line 4—4 of Fig. 2 looking in the direction of the arrows.

Fig. 5 is a view taken along the line 5—5 of Fig. 4 looking in the direction of the arrows.

Fig. 6 is a sectional view taken along the line 6—6 of Fig. 4 looking in the direction of the arrows.

Fig. 7 is a fragmentary view in elevation illustrating the novel knife construction of this machine, and Fig. 8 is an enlarged sectional view taken along line 8—8 of Fig. 2 looking in the direction of the arrows.

Similar characters of reference are employed in said views, to indicate corresponding parts.

Referring now to said drawings the reference numeral 1 designates the novel cloth cutting machine of this invention as a whole. This machine comprises a base 2 that is provided with rollers (not shown) for moving over a supporting surface 3, such as a table top. A standard 4 extends upwardly from base 2 and has the machine casing 5 supported upon the top thereof. Casing 5 carries a motor 6 which is adapted to reciprocate the cutting knife or blade 7 by means of a crank and connecting rod enclosed within casing 5. The knife 7 reciprocates within a slide bearing 8 provided in the standard 4. A vertically adjustable guard or rod 9 is positioned in advance of the blade 7 for protecting the fingers of the user. The guard 9 extends upwardly through a bracket 10 having releasable wedge members therein which serve to hold the rod 9 in any desired vertically adjusted position. The gripping action of the wedges upon the guard 9 is adapted to be released by pressing a lever 11 towards the machine operating handle 12. The guard 9 carries a foot member 13 that is adapted to rest upon the goods being cut, thereby serving to hold the goods down and preventing their vibrating due to the reciprocation of blade 7. The apparatus thus far described is old and well known to those skilled in the art and would appear to require no further description.

According to the construction illustrated, the shaft 14 of motor 6 is provided with a clutch 15 that is normally disengaged but which may be engaged by moving a lever 16 downwardly about its pivotal point 17, this lever having a forked end 18 engaging clutch trunnions 19. Clutch 15 is adapted to connect a flexible shaft 20 within a flexible casing 21 in driven relation with respect to the motor 1. As especially shown in Fig. 4, flexible shaft 20 is connected in driving relation to a vertical shaft 22, carried by a bracket 23, which latter in turn is supported by the lower end of a vertical shaft 24. Shaft 24 extends upwardly through a bearing aperture 25 provided in bracket 10 and is provided with spiral drive grooves 26 that cooperate with a pin 27 carried by bracket 10.

The shaft 22 has a pinion 28 fixed thereon and connected in driving relation to a gear 29 fixed on the lower end portion 30 of shaft 24. Thus, it will be apparent that the turning of shaft 22 will cause pinion 28 to drive gear 29, thereby rotating shaft 24 and causing pin 27, projecting into spiral grooves 26, to effect vertical reciprocation of shaft 24 and of the bracket 23 carried thereby. The shaft 22 is journaled in a boss 31 of bracket 23 and is also journaled in a sleeve 32 fixed to another boss 33 of the bracket 23. Shaft 22 extends downwardly through sleeve 32 and has a pulley 34 fixed upon its lower end, whereby the turning of shaft 22 also effects the turning of pulley 34. Pulley 34 is adapted to drive a second pulley 35, but in a reverse direction, by means of friction rollers 36 carried by arms 37 fixed upon and radiating from the sleeve 32.

The pulleys 34 and 35 are adapted to drive belts 38 and 38' respectively. Belts 38 and 38' extend around idle pulleys 39 that are carried by an arm 40 of the bracket 23. The pulleys 39 are so arranged on the arm 40 as to cause the respective belts 38 and 38' to engage opposite sides of the knife edge of blade 7, as especially shown in Fig. 2. The belts 38 and 38' carry abrasive material 41, such as emery on their outer surfaces, the said friction material serving to sharpen the knife edge of blade 7 when shaft 22 is rotated.

In order that the belts 38 and 38' shall be retained in a tight condition, the same are provided with belt tighteners. This is illustrated in Fig. 8, wherein a pulley 39 is shown carried by block 42 movable within aperture 43 provided in the arm 40 of bracket 23. A coil compression spring 44, the tension of which may be adjusted by a screw 45, engages the block 42, thereby tensioning the belt. The bracket 23 is shown in Fig. 5 as provided with a projection 46 having a bifurcated end for slidably engaging the guard 9, whereby this guard serves to steady the vertical movements of bracket 23 and its connected apparatus. The belts 38 and 38' are shown as having their side edges inwardly beveled at 50 (see Fig. 3) so that the lower end 51 of the knife 7 will not cut these belts when moving into engagement therewith.

In order to maintain the blade or knife 7 in a cool condition, the same is shown as having its rear edge scalloped at 47, thereby enabling the air to have access to the inner portion of the blade and effectively cooling the same. Also, this blade is shown as provided with apertures 48 within which a suitable solid lubricant 49 is contained, the said lubricant serving to lubricate the sides of the slide bearing 8 as blade 7 reciprocates.

In use, the blade 7 reciprocates at a high rate of speed, its amplitude of movement being ordinarily about one inch in practice. When it is desired to sharpen the blade, it is merely necessary to apply finger pressure to lever 16 thereby engaging clutch 15. Lever 16 is so positioned with respect to lever 11 that when lever 16 is pressed to engage the clutch, lever 11 is also pressed to disengage the wedging grip on guard 9, permitting this guard to drop into the position shown in Fig. 1. With the engagement of clutch 15, the flexible shaft 20 is rotated, thereby rotating shaft 22 and causing pinion 28 to rotate shaft 24 so that this latter shaft, together with bracket 23 carrying pulleys 34 and 35 and belts 38 and 38', reciprocate up and down due to the cooperative action of spiral grooves 26 with pin 27.

While the bracket 23 moves up and down at a nominal rate, the belts 36 and 37 are traveling at a high rate of speed, thereby effectively sharpening the knife edge of knife 7 all along its useful length in a very short time. Owing to the beveled construction 50 of the edges of the belts the lower end 51 of the blade 7 does not cut these belts as they move onto blade after having descended below the same. Thus, the operator is enabled to sharpen the knife 7 whenever desired in a few minutes time and without manual labor, thereby saving considerable effort and expense and at the same time enabling the machine of this invention to be used for a greater number of hours per day. Owing to the automatic lubrication and cooling of the knife 7, the same does not run hot regardless of the duration of use of the machine.

It will be noted that with the sharpening mechanism in its raised out of the way position, as shown in Fig. 1, the machine is ready for use in cutting cloth, fabrics or the like. Means may be provided, if desired, to move the idlers 39 apart somewhat during the normal operation of the machine to prevent the knife 7 from rubbing on one spot of each of the belts 38 and 38'. This also may be accomplished by spreading the inner runs of the belts 38 and 38' apart as by use of a wedge. It will be noted that the belts 38 and 38' may be readily removed from their pulleys, as when it is desired to replenish the abrasive material 41, without disturbing the remaining parts of the machine in any way.

In practice it has been found that when using the novel machine of this invention an operator need exert far less pressure in cutting goods than when using machines heretofore constructed which required to be sharpened by hand. Furthermore, the sharpening means of this invention sharpens the knife evenly so as to obtain an absolutely straight edge resulting in long life of the knife and easier cutting which is impossible when the knife is sharpened by hand owing to excessive removal of material and unevenness of the knife edge.

As many changes could be made in the above construction and many apparently widely different embodiments of this invention could be made without departing from the scope thereof, as defined by the following claims, it is intended that all matter contained in the above description or shown in the accompanying drawings shall be interpreted as illustrative and not in a limiting sense.

I claim:

1. In a cloth cutting machine having a driving motor, a reciprocable knife driven from said motor, and means for sharpening said knife, said means comprising belts arranged to be driven from said motor and engaging opposite sides of the cutting edge portion of said knife at staggered points therealong and means for moving said belts bodily along the length of said knife.

2. In a cloth cutting machine having a driving motor, a vertically reciprocable knife driven from said motor, and means for sharpening said knife, said means comprising staggered belts arranged to be driven from said motor and engaging opposite sides of the cutting edge portion of said knife, means for vertically reciprocating said belts, said belts having abrasive material adhered thereto for effecting the rapid sharpening of said knife in use and having their upper and lower edges beveled.

3. In a cloth cutting machine, a reciprocable knife, a motor for driving said knife, and means for sharpening said knife, said sharpening means comprising a pair of staggered endless belts for respectively engaging opposite sides of the cutting edge portion of said knife, and mechanism operated from said motor for driving said belts and for moving the same along the length of said knife while retaining the same in their staggered relation, whereby the knife is sharpened all along its useful length.

4. In a cloth cutting machine, a reciprocable knife, a motor for driving said knife, and means for sharpening said knife, said sharpening means comprising a pair of endless belts operating in independent planes for respectively engaging opposite sides of the cutting edge portion of said knife, mutually aligned driving pulleys for supporting corresponding looped overlapping ends of said belts, mutually spaced idle pulleys for supporting the other looped ends of said belts, and mechanism for rotating said driving pulleys at will and for moving said pulleys and said belts longitudinally of said knife to effect the sharpening of the latter all along its useful length.

5. In a cloth cutting machine, a reciprocable knife, a motor for driving said knife, and means for sharpening said knife, said sharpening means comprising a pair of endless belts for respectively engaging opposite sides of the cutting edge portion of said knife at staggered points therealong, mutually aligned driving pulleys for supporting corresponding overlapping looped ends of said belts, mutually spaced idle pulleys for supporting the other looped ends of said belts, a spirally grooved shaft connected for reciprocating said pulleys and said belts along the length of said knife, and power transmitting means for rotating said driving pulleys and said spirally grooved shaft at will.

6. In a cloth cutting machine, the combination with a motor-driven reciprocating knife, of mechanism for sharpening said knife comprising motor-driven flexible sharpening bands having abrasive surfaces yieldingly contacting opposite sides of the cutting edge of the knife and at staggered points therealong.

7. In a cloth cutting machine, the combination with a motor-driven reciprocating knife, of mechanism for sharpening said knife comprising motor-driven flexible sharpening bands having abrasive surfaces yieldingly contacting opposite sides of the cutting edge of the knife and at staggered points therealong, and means for moving said bands lengthwise along the effective cutting edge of the knife while sharpening the latter.

8. In a cloth cutting machine, the combination with a motor-driven reciprocating knife having a cutting edge substantially parallel with its path of reciprocations, of mechanism for sharpening said knife comprising flexible sharpening bands having abrasive surfaces yieldingly pressed against opposite sides of the cutting edge portion of the knife, and motor-driven mechanism including drive pulleys engaging the bands for positively driving said bands each in a single direction only.

9. In a cloth cutting machine, the combination with a motor-driven reciprocating knife having a cutting edge substantially parallel with its path of reciprocations, of mechanism for sharpening said knife comprising flexible sharpening bands having abrasive surfaces yieldingly pressed against opposite sides of the cutting edge portion of the knife, mechanism including drive pulleys engaging said bands for positively driving the bands each in a direction transverse to the direction of reciprocation of the knife, and means for moving said bands lengthwise of the knife for sharpening the knife edge throughout its effective length.

10. In a cloth cutting machine, the combination with a motor-driven vertically reciprocating knife having a substantially vertical cutting edge, of sharpening means for said knife comprising endless flexible belts having abrasive surfaces yieldingly pressed against opposite sides of the edge portion of the knife, said belts being arranged to travel substantially horizontally and so that portions thereof pass from opposite sides of the knife in opposite oblique directions across the vertical plane of the knife edge to points in advance of said knife edge, and mechanism including drive pulleys engaging the belts for positively driving said belts to cause said portions thereof to travel in said oblique directions away from said knife edge.

11. In a cloth cutting machine, the combination with a motor driven vertically reciprocating knife having a substantially vertical cutting edge, of sharpening means for said knife comprising endless flexible belts having abrasive surfaces yieldingly pressed against opposite sides of the edge portion of the knife, said belts being arranged to travel substantially horizontally and so that portions thereof pass from opposite sides of the knife in opposite oblique directions across the vertical plane of the knife edge to points in advance of said knife edge, mechanism including drive pulleys engaging the belts for positively driving said belts to cause said portions thereof to travel in said oblique directions away from said knife edge, and means for moving said belts vertically along the knife for sharpening said knife edge throughout its effective length.

12. In a cloth cutting machine, the combination with a motor-driven upright vertically reciprocating knife having a substantially vertical front cutting edge, of means for sharpening said knife comprising narrow flexible sharpening band means normally disposed above the lower portion of the knife and having runs with abrasive surfaces arranged at the opposite sides of the knife to travel transversely to the direction of reciprocation of the knife and to yieldingly contact with the cutting edge portion of the knife, motor-driven mechanism for positively driving the band means to cause said travel of said runs thereof transversely to the direction of reciprocation of the knife in sharpening relation to the knife edge, and means for moving said travelling band means lengthwise of the knife for sharpening the knife edge throughout its effective length.

MARTIN GREENBAUM.